(12) United States Patent
Lüthi

(10) Patent No.: US 10,627,211 B2
(45) Date of Patent: Apr. 21, 2020

(54) TEC MODULE HAVING LASER DIODE AS AN INTERFEROMETER LASER BEAM SOURCE IN A LASER TRACKER

(71) Applicant: LEICA GEOSYSTEMS AG, Heerbrugg (CH)

(72) Inventor: Thomas Lüthi, Aarau (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 0 days.

(21) Appl. No.: 15/373,958

(22) Filed: Dec. 9, 2016

(65) Prior Publication Data

US 2017/0167845 A1 Jun. 15, 2017

(30) Foreign Application Priority Data

Dec. 11, 2015 (EP) ..................................... 15199685

(51) Int. Cl.
*G01S 17/66* (2006.01)
*G01B 9/02* (2006.01)
(Continued)

(52) U.S. Cl.
CPC .......... *G01B 9/02038* (2013.01); *F25B 21/02* (2013.01); *G01B 9/02068* (2013.01);
(Continued)

(58) Field of Classification Search
CPC ..... G01B 11/14; G01B 9/02049; G01S 17/66; G01S 17/08
See application file for complete search history.

(56) References Cited

U.S. PATENT DOCUMENTS 7,961,301 B2 * 6/2011 Earhart ................. G01S 3/7867
356/4.01
2010/0253931 A1 10/2010 Meier et al.
(Continued)

FOREIGN PATENT DOCUMENTS

CN 101916957 A 12/2010
CN 102183234 A 9/2011
(Continued)

OTHER PUBLICATIONS

European Search Report dated May 24, 2016 as received in Application No. Ep 15 19 9685.

*Primary Examiner* — Jonathan M Hansen
(74) *Attorney, Agent, or Firm* — Maschoff Brennan

(57) ABSTRACT

Some embodiments of the invention relate to a laser tracker for progressive tracking of a reflective target and for determining the distance to the target having a distance measuring unit, which is designed as an interferometer, for determining a distance change to the target by means of interferometry, a laser beam source for generating measuring radiation for the interferometer, a base, which defines a standing axis, a beam guiding unit for emitting the measuring radiation and for receiving at least a part of the measuring radiation reflected on the target, wherein the beam guiding unit is pivotable by a motor about the standing axis and an inclination axis, which is essentially orthogonal in relation to the standing axis, in relation to the base, and an angle measuring functionality for determining an alignment of the beam guiding unit in relation to the base.

21 Claims, 7 Drawing Sheets

(51) Int. Cl.
  *F25B 21/02* (2006.01)
  *G01S 7/497* (2006.01)
  *G01S 7/481* (2006.01)
  *G01S 17/36* (2006.01)
(52) U.S. Cl.
  CPC ........ *G01B 9/02075* (2013.01); *G01S 7/4814* (2013.01); *G01S 7/4817* (2013.01); *G01S 7/4818* (2013.01); *G01S 7/497* (2013.01); *G01S 17/36* (2013.01); *G01S 17/66* (2013.01); *F25B 2321/021* (2013.01); *G01B 2290/70* (2013.01)

(56) References Cited

U.S. PATENT DOCUMENTS

| | | | |
|---|---|---|---|
| 2012/0320943 A1 | 12/2012 | Cramer et al. | |
| 2013/0051413 A1* | 2/2013 | Chen | H01S 5/02 372/36 |
| 2014/0307264 A1* | 10/2014 | Luthi | G01C 15/002 356/498 |
| 2015/0116816 A1* | 4/2015 | Barannikov | H01S 5/02415 359/337.11 |
| 2015/0138528 A1 | 5/2015 | Lüthi et al. | |
| 2015/0138530 A1 | 5/2015 | Lüthi | |
| 2015/0226841 A1 | 8/2015 | Lüthi et al. | |
| 2015/0346330 A1 | 12/2015 | Markendorf | |
| 2016/0033258 A1 | 2/2016 | Böckem | |
| 2016/0209500 A1 | 7/2016 | Markendorf | |
| 2016/0329681 A1* | 11/2016 | Tulip | H01S 5/02415 |
| 2017/0003372 A1* | 1/2017 | Antoina | G01S 17/66 |

FOREIGN PATENT DOCUMENTS

| | | |
|---|---|---|
| DE | 199 33 518 A1 | 1/2001 |
| EP | 1 923 818 A1 | 5/2008 |
| EP | 2 589 982 A1 | 5/2013 |
| EP | 2 662 661 A1 | 11/2013 |
| EP | 2 662 702 A1 | 11/2013 |
| EP | 2 687 866 A1 | 1/2014 |
| EP | 2 746 806 A1 | 6/2014 |
| EP | 2 746 807 A1 | 6/2014 |
| EP | 2980526 A1 | 2/2016 |
| WO | 2007/079600 A1 | 7/2007 |

* cited by examiner

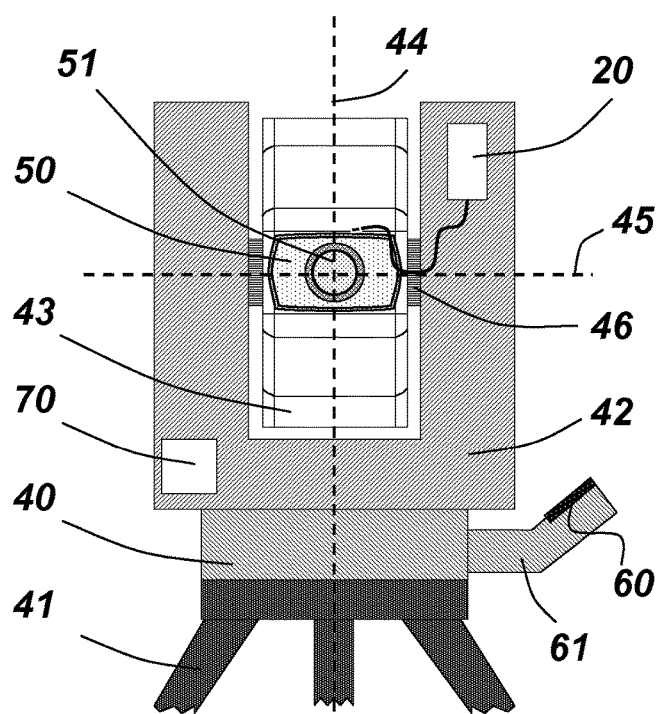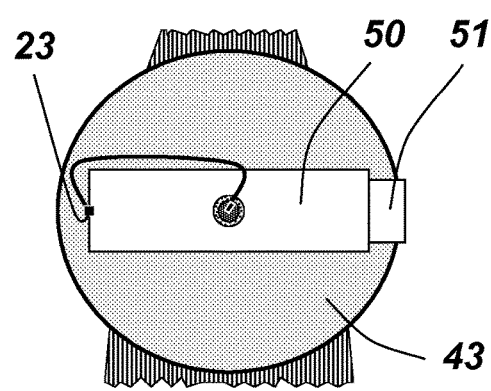
Fig.4a
Fig.4b

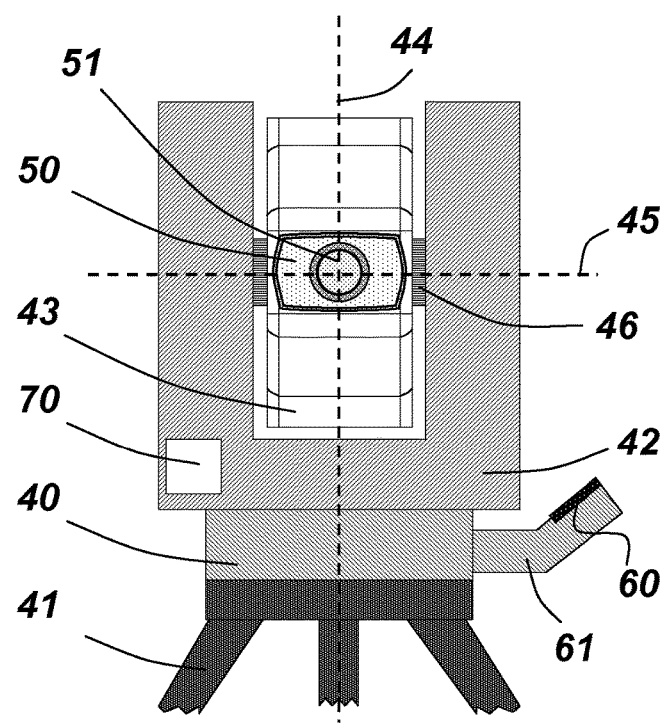
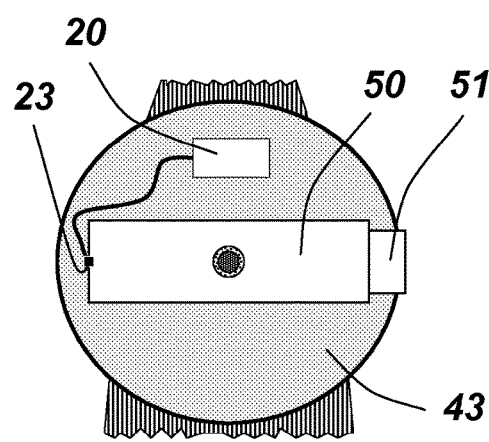
Fig.5a
Fig.5b

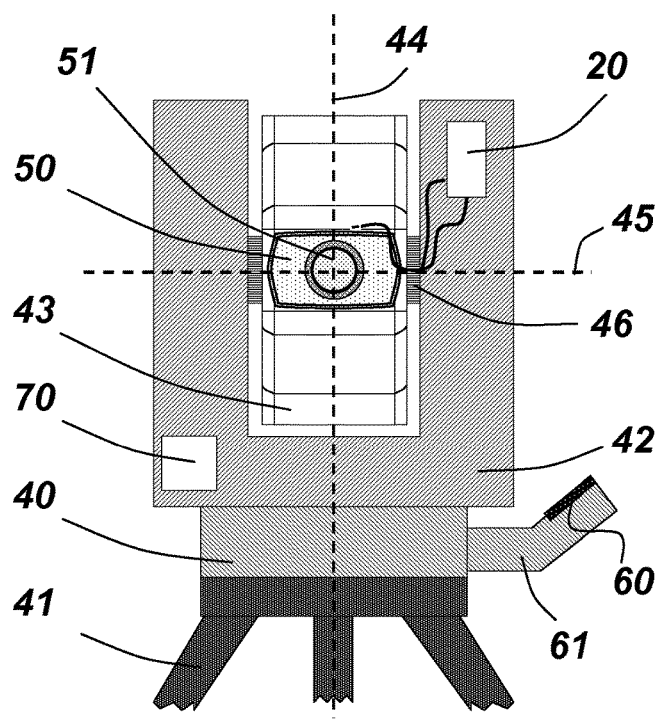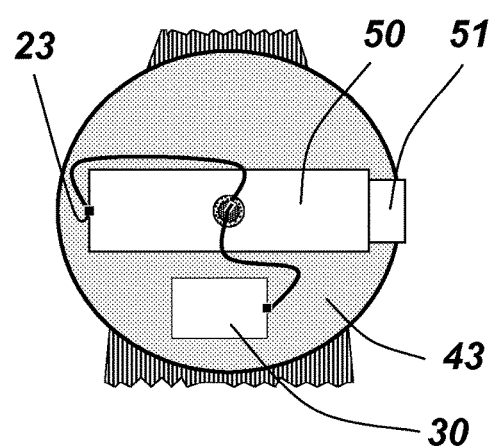
Fig.7a
Fig.7b

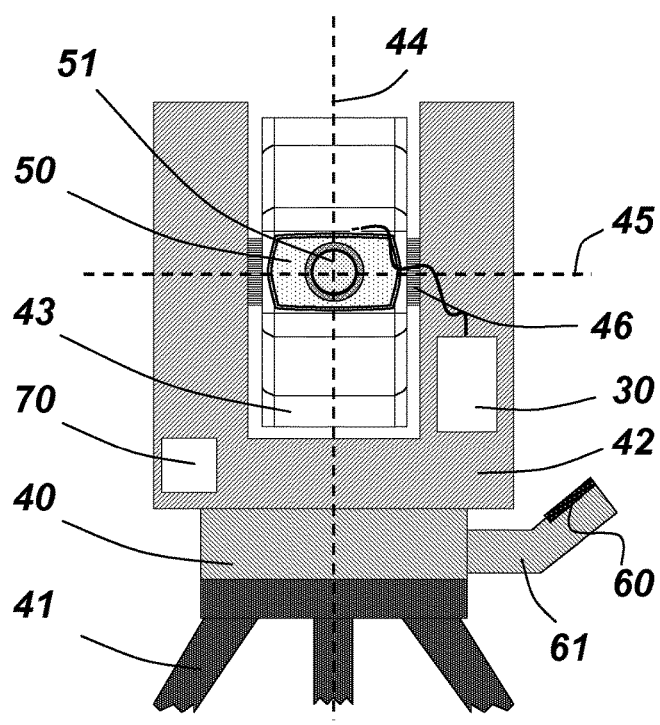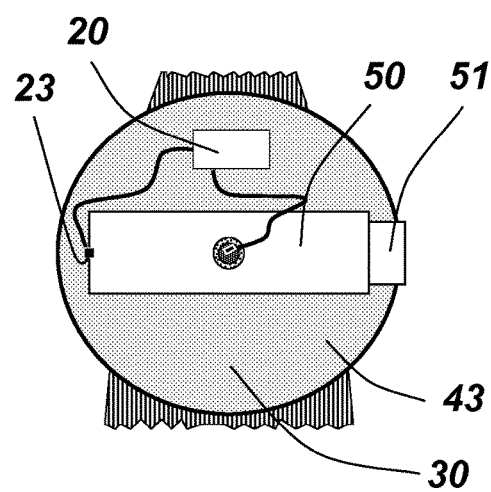
Fig.8a
Fig.8b

TEC MODULE HAVING LASER DIODE AS AN INTERFEROMETER LASER BEAM SOURCE IN A LASER TRACKER

FIELD OF THE INVENTION

The invention relates to a laser tracker having an interferometer and a laser beam source, which is configured as a laser diode, in a thermo-electrically temperature-stabilized cell, referred to as a TEC cell hereafter, for determining a distance change in relation to a target, a use of a laser diode in a TEC cell in a corresponding interferometer, and a method for determining a relative distance to the target.

BACKGROUND

Measuring devices, which are configured for progressive tracking of a target point and a coordinate position determination of this point, can generally be summarized under the term laser trackers. A target point can be represented in this case by a retroreflective unit (for example, a cube prism), which is targeted using an optical measuring beam of the measuring device, in particular a laser beam. The laser beam is reflected in parallel back to the measuring device, wherein the reflected beam is captured using a capture unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the capture of the beam, for example, by means of runtime or phase difference measurement or by means of the Fizeau principle and—increasingly as a standard feature in modern systems—an offset of the received beam from a zero position is ascertained on a sensor.

By means of this offset which is thus measurable, a position difference between the center of a retroreflector and the point of incidence of the laser beam on the reflector can be determined and the alignment of the laser beam can be corrected and/or tracked as a function of this deviation such that the offset on the sensor is reduced, in particular is "zero", and therefore the beam is aligned in the direction of the reflector center. By way of the tracking of the laser beam alignment, progressive target tracking (tracking) of the target point can be performed and the distance and position of the target point can be progressively determined in relation to the measuring device. The tracking can be implemented in this case by means of an alignment change of the deflection mirror, which is movable by a motor and is provided for deflecting the laser beam, and/or by pivoting the targeting unit, which has the beam-guiding laser optical unit.

Laser trackers according to the prior art can additionally be embodied having an optical image capture unit, in particular having a two-dimensional, light-sensitive sensor having an image processing unit, in particular having a camera, the optical unit of which is arranged separately from the optical unit of the laser beam. Using the capture and analysis of an image—by means of image capture unit and image processing unit—of a so-called measuring aid instrument having markings, the relative location of which in relation to one another is known, an orientation of an object (for example, a probe), which is arranged on the measuring aid instrument, in space can be concluded. Together with the determined spatial position of the target point, furthermore the position and orientation of the object in space can be precisely determined absolutely and/or in relation to the laser tracker.

Such laser trackers and methods for the six degrees of freedom determination, in particular by means of corresponding measuring aid instruments, are described, for example, in European patent application 14179139.2.

Laser trackers of the prior art at least have a distance meter for distance measurement, wherein it can be configured, for example, as an interferometer. Because such distance measuring units can only measure relative distance changes, so-called absolute distance meters are installed in current laser trackers in addition to interferometers. For example, such a combination of measuring means for distance determination is described in WO 2007/079600 A1.

The interferometers used in this context for the distance measurement primarily use—because of the long coherence length and the measurement range thus enabled—HeNe gas lasers as light sources. The coherence length of the HeNe laser can be several hundred meters in this case, so that the ranges required in industrial metrology can be achieved using relatively simple interferometer structures. A combination of an absolute distance meter and an interferometer for distance determination using a HeNe laser is known, for example, from WO 2007/079600 A1.

The use of HeNe laser light sources has the disadvantage, however, with regard to a generally desirable miniaturization of laser trackers, of the size thereof, which determines the light power. The power of the light source is significantly dependent in this case on the length of the laser tubes, i.e., the longer the tubes, the greater the achievable emission power. In addition, such a laser source typically displays a relatively high level of power dissipation. The high voltage supply required for operation represents a further disadvantage. For example, a voltage of approximately 7000 V has to be provided for the ignition of the laser and a voltage of approximately 1500 V has to be provided during operation, whereby special components (for example, a high-voltage power supply unit and shield) have to be used and safety measures have to be taken upon the use of such light sources. The sensitivity in relation to magnetic fields (for example, generated by internal motors or external welding transformers) and the limited service life of the tubes (typically approximately 15,000 operating hours) also make the use of HeNe lasers disadvantageous, for example, because the light sources often have to be replaced in the systems in a costly manner.

In principle, HeNe lasers can be replaced by diode lasers as the light source for the interferometer. These laser diodes are compact per se, cost-effective, and have a low power consumption. The following laser diode sources are often used in particular for the use as an interferometer light source:

distributed feedback laser (DFB) (having a periodically structured active medium, for example, lattice),
  distributed Bragg reflector laser (DBR) (having an optical lattice outside the active medium but arranged on a shared chip),
  fiber Bragg grating laser (FBG) (essentially according to a DFB laser, but having a lattice in an external fiber),
  external cavity diode laser (ECDL) (stabilization of the laser diode by means of an external highly stable cavity, for example, having a holographic lattice),
  diode pumped solid-state lasers (DPSS),
  discrete mode lasers (DMD),
  microchip lasers, and/or
  surface emitter lasers (VCSEL).

The beam sources are configured in this case such that the emitted laser beam, with respect to the wavelength, is single mode having a coherence length in the order of magnitude of several tens of meters (and/or a line width <1 MHz).

In addition, a stabilization at a known wavelength is necessary for the use of such laser diodes as an interferometer light source or as a wavelength standard. This can be performed, for example, spectroscopically on an absorption line of an absorption medium (for example, using a gas cell). In this case, a very large number of absorption lines can occur in a desired wavelength range depending on the absorption medium used. On the one hand, so many absorption lines are present that even in the event of manufacturing-related scattering of the emission wavelength of the laser diode, an absorption line is always achievable for stabilization, on the other hand, this line also has to be unambiguously identified upon each restart of the light source to establish the emission wavelength.

For this purpose, in principle it can be stabilized simply on any suitable and defined line and this can be identified in production using an external wavelength meter. By means of storage and reproduction of the diode parameters set for this purpose, for example, temperature and current, with perfect control electronics, one should again land on the original line and find it again using a short wavelength scan. A possible change of the setting parameters of the diode due to aging can be resisted by storing the respective last values.

The requirements for the measuring device are similarly transferable to measuring devices which have an interferometer unit for determining distance changes. In this case, measuring devices which are configured for progressive tracking of a target point and a coordinate position determination of this point can generally be summarized under the term laser trackers. A target point can be represented in this case by a retroreflective unit (for example, a cube prism) which is targeted using an optical measuring beam of the measuring device, in particular a laser beam. The laser beam is reflected in parallel back to the measuring device, wherein the reflected beam is captured using a capture unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the capture of the beam, for example, by means of runtime or phase difference measurement.

A use of a laser diode as an interferometer laser light source is described, for example, in European patent application EP 2 589 982. European patent applications EP 2 662 661 and EP 2 662 702 describe further tunable laser diodes for stabilizing the emission wavelength for use in a laser tracker, in particular wherein an unambiguous identification of an absorption line used for stabilization can be carried out, in particular upon each restart of the system. Finally, European patent application 14179139.2 describes a complete system for a coordinate measuring device of the type in question for measuring coordinates on surfaces of target objects, in particular embodied having a laser tracker having a laser diode beam source.

The use of a specific laser diode with the interferometer of the laser tracker offers advantages with respect to the space requirement linked thereto, which results as significantly less than a HeNe gas laser with greater coherence length at the same time, however. In contrast to a gas laser source, which can also provide measuring radiation having suitable coherence length, in addition, a high-voltage supply is not required for operating the diode. Furthermore, such laser diodes have a lower power consumption.

Laser tracker systems of the type in question having laser diodes according to the prior art furthermore typically have a specific control of the laser diode, in the context of which the laser trackers and the control unit of the laser diode are configured such that the emission wavelength of the measuring radiation is longitudinally variable in a monomodal manner within a specific emission wavelength range. In this case, the emission wavelength can be variable by a temperature change of the laser diode and/or a change of an electrical current applied to the laser diode, controlled by the control unit. Furthermore, the laser diode can be controllable by means of the control unit such that an emission power of the measuring radiation is variable.

A typical construction of a laser diode beam source in a free beam setup according to the prior art typically comprises a laser diode having collimation optical unit, a free beam isolator, and a coupling into an optical fiber, wherein typically the diode and the collimation optical unit are located in a thermo-electrically temperature-stabilized cell (TEC cell). Upon the use of such a setup in a laser tracker, however, it is particularly disadvantageous that as a result of the large operating temperature scope in the laser tracker, the pointing stability requires an active control of the beam direction to keep the coupling efficiency into the fiber. In addition to the complex control and calibration of the laser beam source linked thereto, a further optimization of the space required in the laser tracker is additionally limited. More extensive miniaturization of such a laser diode beam source is therefore only implementable under laboratory conditions.

SUMMARY

Some embodiments of the present invention provide an improved laser beam source in a laser tracker, wherein the means for generating laser radiation for distance measurement are configured more compactly in the entirety thereof and laser radiation emitted for distance determination can be generated in this case such that the emission wavelength of the measuring radiation is longitudinally variable in a monomodal manner within a specific emission wavelength range.

Some embodiments of the invention provide a laser tracker having a distance measuring unit which is improved with respect to the space requirement, wherein a required precision is at least maintained with a simultaneously required measuring range of at least 10 m for the distance determination.

Some embodiments of the invention provide a laser tracker having an interferometer as a distance meter, wherein the optical components, in particular the beam source and supply units provided for this purpose, have a significantly lower space requirement than the prior art.

The invention describes a laser tracker for progressive tracking of a reflective target and for determining the distance to the target having a distance measuring unit, which is configured as an interferometer, for determining a distance change to the target by means of interferometry, a laser beam source, which is configured as a laser diode, for generating measuring radiation for the interferometer, a base, which defines a standing axis, a beam guiding unit for emitting the measuring radiation and for receiving at least a part of the measuring radiation reflected on the target, wherein the beam guiding unit is pivotable by a motor about the standing axis and an inclination axis, which is essentially orthogonal in relation to the standing axis, in relation to the base, and an angle measuring functionality for determining an alignment of the beam guiding unit in relation to the base, wherein the laser tracker is characterized in that the laser beam source is integrated into a thermo-electrically temperature-stabilized cell, referred to as a TEC cell hereafter, wherein at least the following components are arranged inside the TEC cell:
- a laser diode,
- a collimation optical unit,
- an optical mini-isolator unit, and
- at least one polarization-retaining fiber coupling for the measuring radiation for the interferometer.

The temperature stabilization can be performed in this case both by cooling and also heating by way of the TEC cell. In particular, it is clear to a person skilled in the art that a TEC cell can also (or exclusively) be used for heating, even if the abbreviation TEC is derived from "thermo-electric cooler".

Primarily the wavelength of the generated laser radiation is stabilized by means of the temperature regulation by the TEC cell. The integration of the collimation optical unit, the mini-isolator unit, and the fiber coupling into the temperature-stabilized TEC cell also has the additional advantage in this case in particular that therefore, for example, a suitable coupling efficiency of the laser radiation into the at least one fiber coupling is ensured, in particular exclusively by the temperature regulation of the TEC cell. An active control of the beam direction, as is routine in conventional laser sources from the prior art, to maintain the coupling efficiency into the fiber, is therefore no longer necessary and the thus reduced mechanical and electronic expenditure enables, for example, further miniaturization of the laser diode beam source and thus an optimization of the space requirement in the laser tracker.

With respect to the wavelength emitted by the laser diode, emission spectral ranges are advantageous which are in the visible optical range, in particular in the "red wavelength range", or in the near infrared range. For example, in one embodiment having an emission wavelength range in the visible wavelength range, the emitted red laser light of the laser beam source can be used not only for interferometric measurements, but rather also as a marking light. A targeting point can be made visually visible to a user of the laser tracker, for example, by the generation of a red spot on a target object. Furthermore, laser diodes in the red wavelength range in particular also offer required space advantages in relation to alternative beam sources and stabilization units usable therewith, which emit in the red wavelength range.

A further embodiment of the invention is therefore characterized in that the emission wavelength of the measuring radiation is between 500 nm and 800 nm, in particular between 630 nm and 635 nm, or between 850 nm and 900 nm, in particular between 850 nm and 855 nm, or between 892 nm and 896 nm.

A further optimization of the space requirement in the laser tracker can be achieved by a modular construction of the laser beam source. According to the invention, the following additional components are therefore arranged inside the TEC cell in a further embodiment:
- at least one beam splitter for generating the measuring radiation for the interferometer and at least one further auxiliary radiation, in particular a reference radiation for the interferometer, and
- at least one additional fiber coupling for the at least one further auxiliary radiation.

In a further embodiment, the optical mini-isolator unit in the TEC cell has two mini-isolators, which are arranged so that the radiation generated by the laser diode is adapted such that a perpendicular or parallel orientation of the polarization plane of the radiation is generated in relation to the at least one beam splitter. This is advantageous in particular because the beam splitters typically do not have a polarization-retaining layer.

According to the present invention, the TEC cell is monitored in a further embodiment by means of a monitoring and control unit, which ensures a predefined optimum coupling efficiency of the measuring radiation into the at least one fiber coupling of the TEC cell, in particular by means of a temperature regulation of the TEC cell. Especially in cooperation with a possibly provided external self-balancing unit for the initialization of the laser tracker, or the TEC cell, respectively, this embodiment enables a modular use of the laser beam source in various preferred embodiments of a laser tracker system, in particular with regard to space requirement and optical and electronic expenditure. Such a self-balancing unit can be attached, for example, to a boom arm of the laser tracker housing and can contain one or more mirrors, reflectors, and/or sensors. Particularly advantageous embodiments (not shown here) of a self-balancing unit are extensively described in particular in European patent applications EP 2 687 866 A1, EP 2 746 806 A1, and EP 2 746 807 A1.

The modular usability of the laser beam source in various measuring systems is illustrated in particular by a further special embodiment, wherein the TEC cell and the monitoring and control unit of the TEC cell are integrated into a single housing and the laser beam source is pre-calibrated by means of the monitoring and control unit of the TEC cell for standalone operation.

According to the invention, the laser diode can be embodied as a Bragg mirror laser diode (DBR laser diode), a distributed feedback laser (DFB laser), a Fabry-Perot laser diode having downstream volume-holographic lattice (VHG), or as a surface emitter (VCSEL).

In a further embodiment, the laser tracker has at least one optical fiber, wherein the measuring radiation and/or the at least one auxiliary radiation can be guided by means of optical fibers, in particular wherein the radiations which can be generated by the laser beam source are coupled into optical fibers. By means of the beam guiding by an optical fiber, for example, optical components can be arranged in different parts of the laser tracker. The flexibility with respect to the structural construction of the tracker can thus be increased.

In one special embodiment of the laser tracker, it additionally has a wavelength stabilization unit for stabilizing the measuring radiation generated by the laser beam source, so that the emission wavelength is continuously present within a defined wavelength range, in particular wherein the wavelength stabilization unit is configured as an absorption cell, in particular wherein the laser tracker has an optical connection fiber for connecting the wavelength stabilization unit to the laser beam source. This enables, for example, an unambiguous identification of an absorption line used for stabilization, in particular during each startup of the system, or enables continuous monitoring of the system state or an adaptation of the desired emission wavelength of the measuring radiation, in particular wherein the emission wavelength of the measuring radiation is variable longitudinally in a monomodal manner within a specific emission wavelength range.

The spectral range of the emission wavelength is ideally adapted to the spectral range of the absorption cell used so that the broadest possible wavelength overlap is achieved between the two spectral ranges. Frequently used absorption cells operate in particular in the following ranges:

532 nm-770 nm (J absorption lines),
760 nm (O absorption),
780 nm-795 nm (Rb absorption lines).

A further embodiment of the invention describes a laser tracker which has a support, which is pivotable about the standing axis in relation to the base, and wherein the beam guiding unit is configured as a targeting unit, which is pivotable about the inclination axis in relation to the support.

In this embodiment, further embodiments are possible, which are possibly to be preferred depending on the space requirement, mechanism, heat generation, or electronics, for example:

that the laser beam source is arranged in the targeting unit or the support, or the laser beam source is arranged in the targeting unit or the support and simultaneously a wavelength stabilization unit is arranged in the targeting unit or the support, wherein optionally the measuring radiation and/or the at least one auxiliary radiation can be coupled by means of optical fibers into the support and/or the targeting unit.

Furthermore, the invention relates to the use of a laser beam source according to the invention in a distance measuring unit, which is configured as an interferometer, of a laser tracker for determining a distance change to a target by interferometry by means of the measuring radiation which can be generated by the laser beam source.

The invention furthermore includes a method for determining a distance change to a target by means of interferometry using a laser tracker having a base, which defines a standing axis, a beam guiding unit for emitting a measuring radiation and for receiving at least a part of the measuring radiation reflected on the target, wherein the beam guiding unit is pivotable by a motor about the standing axis and an inclination axis, which is essentially orthogonal in relation to the standing axis, in relation to the base, a distance measuring unit, which is configured as an interferometer, for determining a distance change to the target by means of interferometry, and an interferometer laser beam source, which is configured as a laser diode, for generating the measuring radiation for the interferometer, and having an emission of the measuring radiation, a reception of the at least one part of the measuring radiation reflected on the target, and the determination of the relative distance, wherein the method is characterized in that the laser beam source is integrated into a thermo-electrically temperature-stabilized cell, referred to as a TEC cell hereafter, wherein at least the following components are arranged inside the TEC cell:

a laser diode,
a collimation optical unit,
an optical mini-isolator unit, and
at least one polarization-retaining fiber coupling for the measuring radiation for the interferometer.

A further embodiment of the method is furthermore characterized in that a stabilization of the measuring radiation generated by the laser beam source is performed such that the emission wavelength is continuously present within a defined tolerance range for the wavelength.

BRIEF DESCRIPTION OF THE DRAWINGS

The laser tracker according to the invention and the method according to the invention will be described in greater detail solely by way of example hereafter on the basis of specific exemplary embodiments which are schematically illustrated in the drawings, wherein further advantages of the invention will also be described. In the figures:

FIGS. 4a and 4b show a further embodiment of a laser tracker according to the invention having the laser beam source arranged in a support of a targeting unit;

FIGS. 5a and 5b show a further embodiment of a laser tracker according to the invention having the laser beam source arranged in the targeting unit;

FIGS. 7a and 7b show a further embodiment of a laser tracker according to the invention having the laser beam source arranged in the support, and a wavelength stabilization unit arranged in the targeting unit;

FIGS. 8a and 8b show a further embodiment of a laser tracker according to the invention having the laser beam source arranged in the targeting unit, and a wavelength stabilization unit arranged in the support.

DETAILED DESCRIPTION

Figure 1:
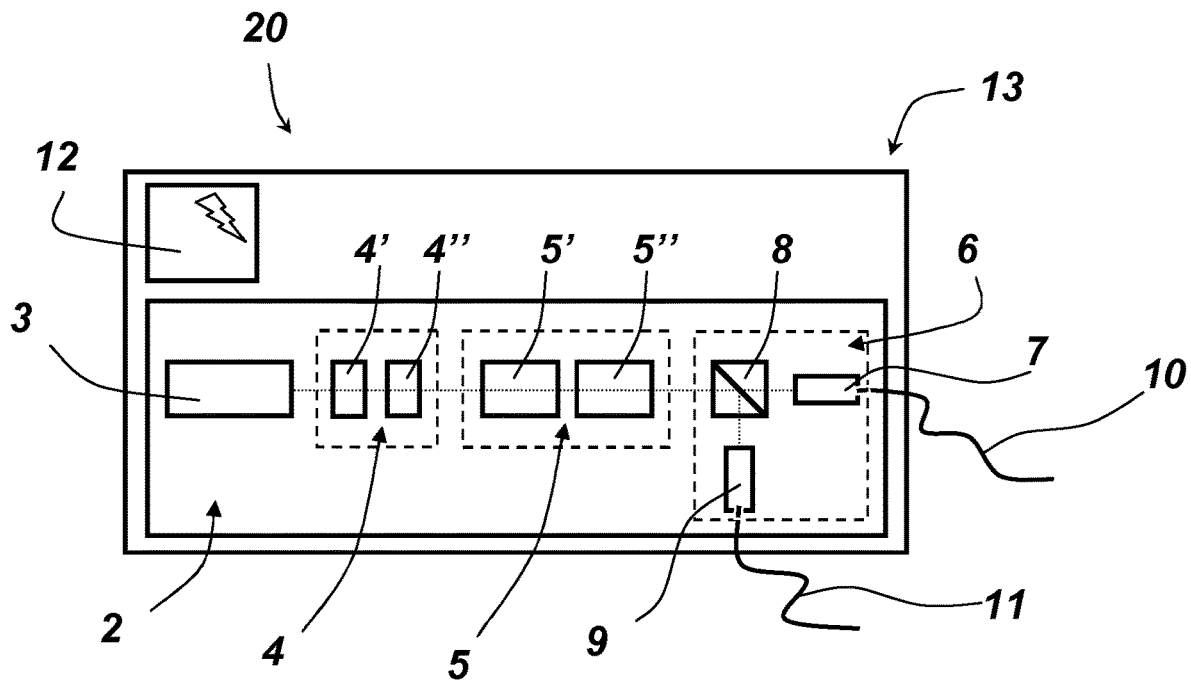
FIG. 1 shows an arrangement according to the invention for a laser diode beam source in a TEC cell.

FIG. 1 shows an arrangement according to the invention for a laser beam source 20 having a laser diode 3 in a thermo-electrically temperature-stabilized cell 2, referred to as a TEC cell hereafter. A laser diode 3, for example, a DBR diode, a collimation unit 4 having collimation optical unit 4', 4", followed by a mini-isolator unit 5 and a decoupling unit 6 are located in a hermetically shielded TEC cell 2. The decoupling unit 6 has in particular a polarization-retaining fiber coupling unit 7 for the coupling of the generated measuring radiation into an optical fiber 10 and optionally, by means of at least one beam splitter, in the example shown precisely one beam splitter 8, can have further general fiber coupling units, in the example shown one further fiber coupling unit 9, for coupling into further fibers 11, 11* (not shown). If beam splitters are used, the mini-isolator unit 5 preferably has two mini-isolators 5', 5", which are arranged so that the radiation generated by the laser diode 3 is adapted such that a perpendicular or parallel orientation of the polarization plane of the radiation is generated in relation to the beam splitters, in the example shown the one beam splitter 8. This is advantageous in particular because the beam splitter typically does not have a polarization-retaining layer.

Furthermore, a monitoring and control unit 12 is indicated in FIG. 1, by means of which the TEC cell 2 is monitored to stabilize the wavelength of the measuring radiation 22 by means of a temperature regulation by way of the TEC cell. Furthermore, the integration according to the invention of the collimation unit 4, the mini-isolator unit 5, and the decoupling unit 6 into the temperature-stabilized TEC cell additionally has the result that by way of the temperature regulation, an optimized coupling efficiency of the measuring radiation 22 into the at least one (polarization-retaining) fiber coupling 7 of the TEC cell 2 is ensured at the same time. An active control of the beam direction to keep the coupling efficiency into the fiber 10 is therefore not required and the mechanical and electronic expenditure thus reduced enables, for example, a further miniaturization of the laser beam source 20 and thus an optimization of the space requirement in the laser tracker 1.

In particular laser diodes 3 having emission spectral ranges which are in the visible optical range, in particular in the "red wavelength range", or in the near infrared range, are particularly advantageous. For example, in an embodiment having an emission wavelength range in the visible wavelength range, the emitted red laser light of the laser beam source can be used not only for interferometric measurements, but rather also as a marking light. A targeting point can be made visually visible to a user of the laser tracker 1, for example, with the generation of a red spot on a target object.

In the example shown, the temperature-stabilized TEC cell 2 and the monitoring and control unit of the TEC cell 12 are furthermore integrated into a single housing 13 of the laser beam source, wherein, for example, the laser beam source 20 can be pre-calibrated by means of the monitoring and control unit of the TEC cell 12 for standalone operation.

Especially in cooperation with a possibly provided external self-balancing unit 60 (not shown here, see FIG. 3) for the initialization of the laser tracker 1, or the TEC cell 2, respectively, this embodiment enables a modular use of the laser beam source 20 in various preferred embodiments of a laser tracker system, in particular with regard to space requirement and optical and electronic expenditure.

Figure 2:
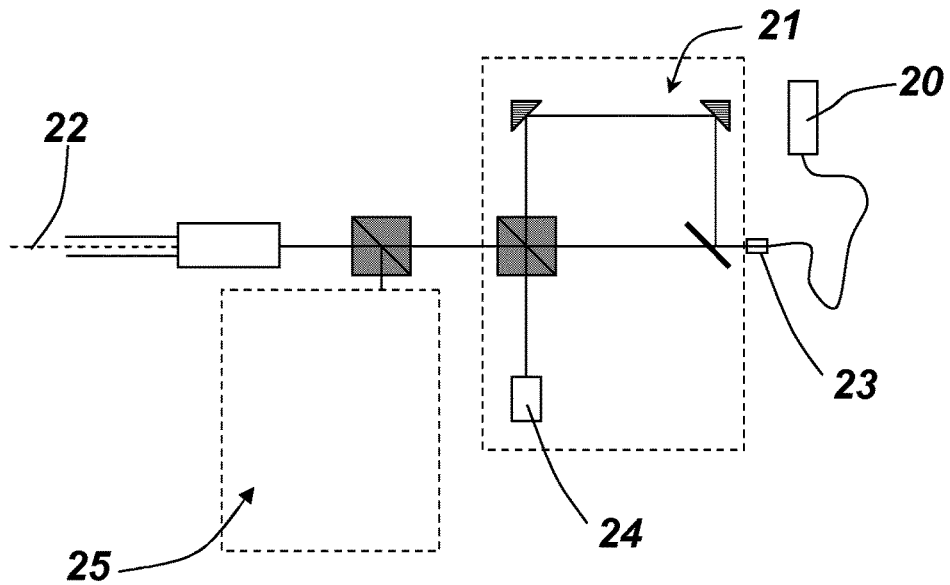
FIG. 2 shows an optical arrangement according to the invention for a laser tracker having an interferometer and a laser beam source for generating a measuring radiation for the interferometer.

FIG. 2 shows an optical arrangement according to the invention for a laser tracker 1 having an interferometer 21 and a laser beam source 20 for generating a measuring radiation 22 for the interferometer 21. The optical arrangement of the laser tracker 1 has in this case a laser beam source 20 according to the invention and a collimator 23 for coupling the laser radiation generated using the laser beam source 20 into the measuring beam path. The radiation is guided in the construction shown by means of an optical fiber 10 from the laser beam source 20 to the collimator 23, but alternatively can also be coupled directly or by optical deflection means into the measuring beam path.

The optical arrangement additionally has an interferometer unit 21, by means of which distance changes to the target can be detected and measured. The radiation generated using the beam source 20 is used as the measuring radiation 22 for the interferometer 21, split in the interferometer 21 into a reference path and a measuring path, and, after reflection of the measuring beam on the target, detected together with the reference beam on a detector 24. Furthermore, laser trackers according to the prior art usually also have additional measuring components 25, for example, an absolute distance measuring unit, usually having a separate beam source, wherein the radiation generated thereby can be guided by means of a beam splitter together with the interferometer radiation on a shared measuring beam path.

Figure 3A:
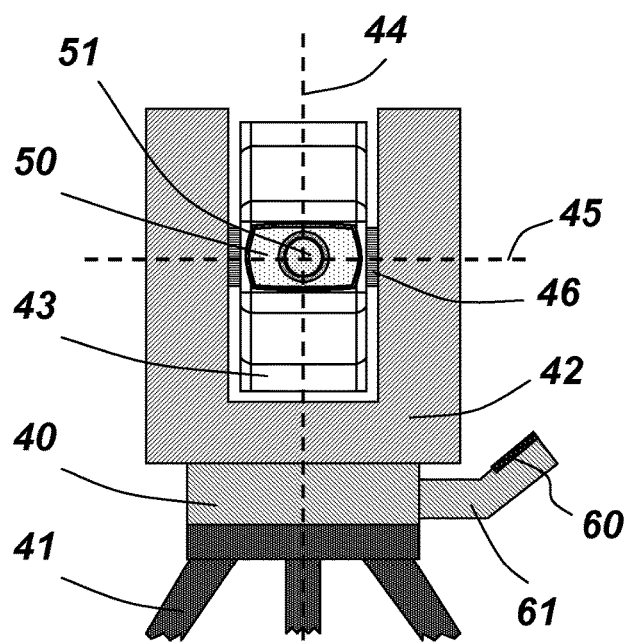
FIGS. 3a and 3b show an exemplary embodiment of a laser tracker according to the invention.

FIG. 3a shows an exemplary embodiment of a laser tracker 1 according to the invention in a frontal view. The laser tracker 1 comprises a base 40, which is fastenable on a holding device, shown here in the form of a tripod 41. A support 42 is attached to the base 40 so as to be rotatably mounted about the vertical axis 44. The support 42 comprises a first and a second spar, which protrude upward from a lower part of the support 42 and on which a beam guiding unit 43 is mounted so as to be tiltable by means of a shaft 46 about the horizontal axis 45. Both the mounting of the support 42 on the base 40 and also the mounting of the beam guiding unit on the support 42 are preferably embodied as a fixed-free bearing. Axial errors as a result of temperature influences and the accuracy losses resulting therefrom are thus minimized. In addition, a temperature-related expansion of the shaft 46 is noncritical and does not influence a tension of the bearing. The tension of the bearing thus remains constant over the entire temperature usage range.

Multiple optical units can be provided on the beam guiding unit 43, wherein in the example shown, only one objective lens module 50 for the target tracking functionality having a laser emitting and receiving optical unit 51 of an optical distance measuring device is shown.

The base 40 preferably has a self-balancing unit 60 for the self-balancing and/or the initialization of the laser tracker 1. This self-balancing unit 60 can be attached, for example, to a boom arm 61 of the base 40 and can contain one or more mirrors, reflectors, and/or sensors. Particularly advantageous embodiments (not shown here) of a self-balancing unit 60 are described extensively in particular in European patent applications EP 2 687 866 A1, EP 2 746 806 A1, and EP 2 746 807 A1.

The laser tracker 1 additionally has an analysis and control unit 70. It is provided here in the support 42 by way of example.

Figure 3B:
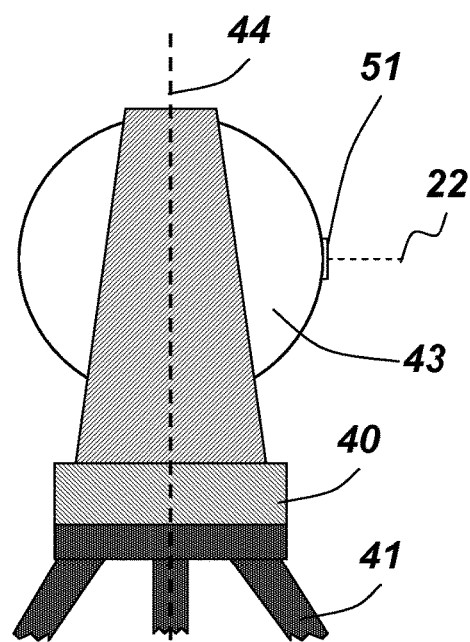

FIG. 3b shows the laser tracker 1 from FIG. 3a in a side view. The construction of the laser tracker 1 can also be inferred from this view, having the base 40 arranged on a tripod 41, the support 42, which is fastened thereon so as to be rotatable about the vertical axis 44, and the beam guiding unit 43, which is mounted so as to be rotatable about the horizontal axis 45. In addition, the laser measuring beam 22, which is emitted from the laser emitting and receiving optical unit 51 of the optical distance measuring device, is shown.

Figure 6A:
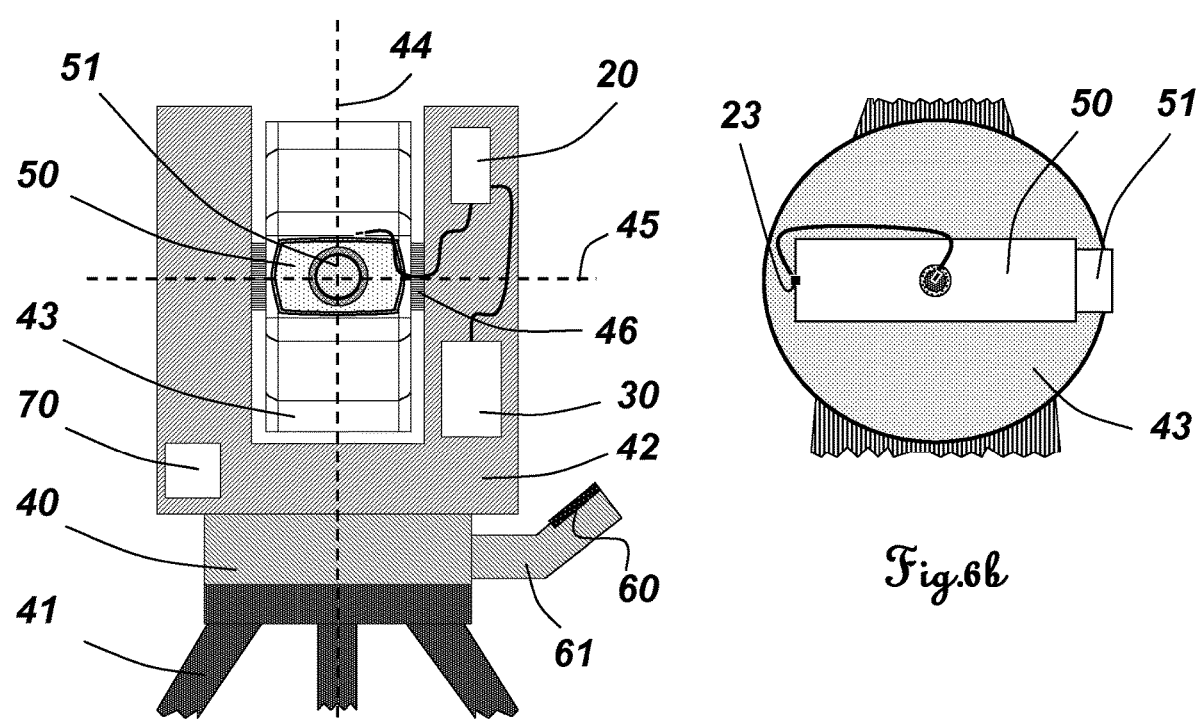
FIGS. 6a and 6b show a further embodiment of a laser tracker according to the invention having the laser beam source arranged in the support, and a wavelength stabilization unit in the support.
Figure 6B:
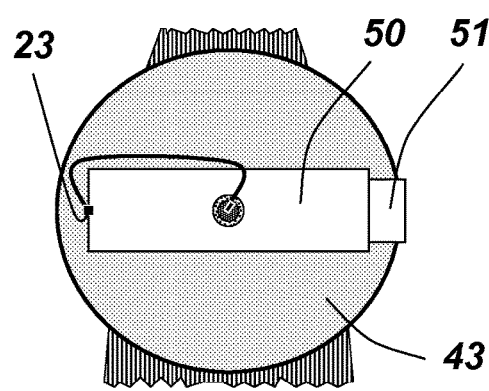

FIGS. 4 to 8 show exemplary embodiments of the laser tracker 1 with possible placements of the laser beam source 20 in the support 42 or the beam guiding unit 43, wherein the exemplary embodiments shown in FIGS. 6, 7, 8 also comprise a wavelength stabilization unit 30, each arranged, for example, in the support 42 or the beam guiding unit.

The advantages and disadvantages of various placements of the laser beam source 20 and/or the wavelength stabilization unit 30 primarily result from space reasons or possibly provided system specifications or specifications with respect to the heat generation of individual components of the laser tracker, for example, a maximum permitted temperature of the beam guiding unit 43 to prevent combustion by the user. For example, heat-generating components, such as possibly the laser beam source 20, are therefore preferably placed in the support 42, because the beam guiding unit 43 often already comprises further heat-generating components.

Depending on the arrangement of the laser beam source 20 in the support 42 (FIGS. 4, 6, 7) or the beam guiding unit 43 (FIGS. 5, 8), a waveguide system leads from the laser beam source 20 through the shaft 46 into the beam guiding unit 43 (FIGS. 4, 6, 7) and, if provided, from the laser beam source 20 to the wavelength stabilization unit 30, possibly also through the shaft 46, which can also be arranged both in the support 42 (FIGS. 6, 8) and also in the beam guiding unit 43 (FIG. 7). The laser measuring beam 22 is therefore coupled via the waveguide system into the objective lens module 50 and the laser emitting and receiving optical unit 51.

The wavelength stabilization unit 30 causes the wavelength of the laser radiation to be kept substantially constant. The radiation thus stabilized is guided through the waveguide system to the interferometer 21 in the beam guiding unit 43. As a result of the measuring radiation 22 thus generated having greater coherence length and wavelength stability, measurements of distance changes can be carried out with high precision using the interferometer 21.

For the stabilization by means of the wavelength stabilization unit 30, both the auxiliary radiation of the laser beam source 20 can be used, if present (as shown in FIGS. 6 and 7), or, for example, via splitting of the measuring radiation 22 generated by the laser beam source 20 outside the laser beam source, the measuring radiation 22 of the laser beam source 20.

It is obvious that these illustrated figures only schematically illustrate possible exemplary embodiments. The various approaches can also be combined, according to the invention, with one another and with interferometry methods for measuring distance changes, with methods for distance determination, and with measuring devices of the type in question, in particular laser trackers, of the prior art. The aspects according to the invention can also be used in geodetic surveying devices—such as total stations and tachymeters.

The invention claimed is:

1. A laser tracker for progressive tracking of a reflective target and for determining coordinates of the target, the laser tracker comprising:
    a distance measuring unit, which is designed as an interferometer, for determining a distance change to the target by means of interferometry,
    a laser beam source, which is designed as a laser diode, for generating measuring radiation for the interferometer,
    a base, which defines a standing axis,
    a support, which is pivotable in a motorized fashion about the standing axis in relation to the base,
    a targeting unit for emitting the measuring radiation and for receiving at least a part of the measuring radiation reflected on the target, wherein the targeting unit is pivotable in a motorized fashion about an inclination axis, which is essentially orthogonal to the standing axis, in relation to the support,
    a wavelength stabilization unit for stabilizing the measuring radiation generated by the laser beam source, so that an emission wavelength is continuously present within a defined wavelength range, wherein the wavelength stabilization unit is designed as an absorption cell,
    an optical connection fiber connecting the wavelength stabilization unit to the laser beam source, and
    an angle measuring functionality for determining an alignment of the support in relation to the base and for determining an alignment of the targeting unit in relation to the support, wherein:
        the laser beam source is integrated into a thermoelectrically temperature-stabilized cell, referred to as a TEC cell hereafter, wherein at least the following components are arranged inside the TEC cell:
        the laser diode,
        a collimation optical unit,
        an optical mini-isolator unit, and
        at least one polarization-retaining fiber coupling for the measuring radiation for the interferometer,
        at least one beam splitter for generating the measuring radiation for the interferometer and at least one further auxiliary radiation, and
        at least one additional fiber coupling for the at least one further auxiliary radiation,
    wherein the optical mini-isolator unit in the TEC cell has two mini-isolators, which are arranged so that the radiation generated by the laser diode is adapted such that a perpendicular or parallel orientation of the polarization plane of the radiation is generated in relation to the at least one beam splitter, and
    wherein the TEC cell is configured for providing wavelength-stabilization of the measuring radiation and stabilization of the coupling efficiency of the measuring radiation into the at least one fiber coupling of the TEC cell by means of temperature regulation by the TEC cell, and
    the laser beam source is arranged in the targeting unit or in the support.

2. The laser tracker according to claim 1, wherein the emission wavelength of the measuring radiation is between 600 nm and 700 nm.

3. The laser tracker according to claim 1, wherein the emission wavelength of the measuring radiation is between 850 nm and 900 nm.

4. The laser tracker according to claim 1, wherein the emission wavelength of the measuring radiation is between 850 nm and 855 nm.

5. The laser tracker according to claim 1, wherein the emission wavelength of the measuring radiation is between 892 nm and 896 nm.

6. The laser tracker according to claim 1, wherein:
    the TEC cell of the laser beam source is monitored by means of a monitoring and control unit, which ensures a predefined optimum coupling efficiency of the measuring radiation into the at least one fiber coupling of the TEC cell by temperature regulation of the TEC cell,
    wherein the TEC cell and the monitoring and control unit of the TEC cell are integrated into a single housing of the laser beam source and the laser beam source is pre-calibrated by means of the monitoring and control unit of the TEC cell for standalone operation.

7. The laser tracker according to claim 1, wherein:
    the laser diode comprises a Bragg mirror laser diode (DBR laser diode) or a Fabry-Perot laser diode having downstream volume holographic lattice (VHG), or as a surface emitter (VCSEL).

8. The laser tracker according to claim 1, wherein:
    the laser tracker comprises at least one optical fiber, wherein the measuring radiation and/or the at least one auxiliary radiation can be guided by means of optical fibers, wherein the radiations which can be generated by the laser beam source are coupled into optical fibers.

9. The laser tracker according to claim 1, wherein:
    when the laser beam source is arranged in the targeting unit, the wavelength stabilization unit is arranged in the support, wherein the measuring radiation and/or the at least one auxiliary radiation can be coupled by means of optical fibers into the support.

10. The laser tracker according to claim 1, wherein:
    when the laser beam source is arranged in the support, the measuring radiation and/or the at least one auxiliary radiation can be coupled by means of optical fibers into the targeting unit,
    wherein the wavelength stabilization unit is arranged in the support, wherein the measuring radiation and/or the at least one auxiliary radiation can be coupled by means of optical fibers into the targeting unit.

11. A method for determining coordinates of a target using a laser tracker,
    the laser tracker comprising:
        a base, which defines a standing axis, a support, which is pivotable in a motorized fashion about the standing axis in relation to the base, a targeting unit for emitting a measuring radiation and for receiving at least a part of the measuring radiation reflected on the target, wherein targeting unit is pivotable in a motorized fashion about an inclination axis, which is essentially orthogonal to the standing axis, in relation to the support, a wavelength stabilization unit for stabilizing the measuring radiation generated by the laser beam source, so that an emission wavelength is continuously present within a defined wavelength range, wherein the wavelength stabilization unit is designed as an absorption cell, an optical connection fiber connecting the wavelength stabilization unit to the laser beam source, and an angle measuring functionality for determining an alignment of the support in relation to the base and for determining an alignment of the targeting unit in relation to the support, a distance measuring unit, which is designed as an interferometer, for determining a distance change to the target by means of interferometry, and an interferometer laser beam source, which is designed as a laser diode, for generating the measuring radiation for the interferometer;

the method comprising:
emitting the measuring radiation,
receiving at least one part of the measuring radiation reflected on the target, and
determining the relative distance, wherein:
the laser beam source is integrated into a thermo-electrically temperature-stabilized cell, referred to as a TEC cell hereafter, wherein at least the following components are arranged inside the TEC cell:
a laser diode,
a collimation optical unit,
an optical mini-isolator unit,
at least one polarization-retaining fiber coupling for the measuring radiation for the interferometer,
at least one beam splitter for generating the measuring radiation for the interferometer and at least one further auxiliary radiation, and
at least one additional fiber coupling for the at least one further auxiliary radiation,
wherein the optical mini-isolator unit in the TEC cell has two mini-isolators, which are arranged so that the radiation generated by the laser diode is adapted such that a perpendicular or parallel orientation of the polarization plane of the radiation is generated in relation to the at least one beam splitter, and
wherein the TEC cell is configured for providing wavelength-stabilization of the measuring radiation and stabilization of the coupling efficiency of the measuring radiation into the at least one fiber coupling of the TEC cell by means of temperature regulation by the TEC cell, and
the laser beam source is arranged in the targeting unit or in the support.

12. The method according to claim 11, wherein:
a stabilization of the measuring radiation generated by the laser beam source is performed such that the emission wavelength is continuously present within a defined tolerance range for the wavelength.

13. The laser tracker according to claim 1, wherein the TEC includes a hermetically shielded housing that contains the laser diode, collimation optical unit, optical mini-isolator unit, and at least one polarization-retaining fiber coupling for the measuring radiation for the interferometer.

14. The laser tracker according to claim 13, the following components being arranged inside the hermetically shielded housing of the TEC cell:
the at least one beam splitter for generating the measuring radiation for the interferometer and at least one further auxiliary radiation, and
the at least one additional fiber coupling for the at least one further auxiliary radiation.

15. The laser tracker according to claim 13, further comprising:
a monitoring and control unit configured for ensuring a predefined optimum coupling efficiency of the measuring radiation into the at least one fiber coupling of the TEC cell by temperature regulation of the TEC cell, wherein the monitoring and control unit is located outside of the hermetically shielded housing of the TEC cell.

16. The laser tracker according to claim 15, further comprising a housing that contains the hermetically shielded housing of the TEC cell and the monitoring and control unit.

17. The laser tracker according to claim 16, the following components being arranged inside the hermetically shielded housing of the TEC cell:
the at least one beam splitter for generating the measuring radiation for the interferometer and at least one further auxiliary radiation, and
the at least one additional fiber coupling for the at least one further auxiliary radiation.

18. The laser tracker according to claim 1, wherein the TEC cell is configured to stabilize the wavelength so that a suitable coupling efficiency of the laser radiation into the at least one fiber coupling is ensured without active beam direction control.

19. The laser tracker according to claim 1, wherein the TEC cell is configured to stabilize the wavelength so that a suitable coupling efficiency of the laser radiation into the at least one fiber coupling is ensured exclusively by the temperature regulation of the TEC cell.

20. The laser tracker according to claim 1, wherein the TEC cell is configured to perform the temperature regulation by cooling and heating.

21. The laser tracker according to claim 1, wherein a spectral range of the emission wavelength is adapted to a spectral range of the absorption cell.

* * * * *